United States Patent
Frimpong-Ansah

(10) Patent No.: US 8,150,691 B2
(45) Date of Patent: Apr. 3, 2012

(54) ARRANGEMENT AND METHOD FOR REPRODUCING AUDIO DATA AS WELL AS COMPUTER PROGRAM PRODUCT FOR THIS

(75) Inventor: Kwaku Frimpong-Ansah, Vienna (AT)

(73) Assignee: Nuance Communications Austria GmbH, Vienna (AT)

( * ) Notice: Subject to any disclaimer, the term of this patent is extended or adjusted under 35 U.S.C. 154(b) by 531 days.

(21) Appl. No.: 10/531,013

(22) PCT Filed: Oct. 13, 2003

(86) PCT No.: PCT/IB03/04497
§ 371 (c)(1),
(2), (4) Date: Apr. 12, 2005

(87) PCT Pub. No.: WO2004/036541
PCT Pub. Date: Apr. 29, 2004

(65) Prior Publication Data
US 2006/0044956 A1    Mar. 2, 2006

(30) Foreign Application Priority Data
Oct. 17, 2002    (EP) .................................... 02102461

(51) Int. Cl.
*G10L 15/04*    (2006.01)
(52) U.S. Cl. ........ 704/251; 704/246; 704/247; 704/252; 704/260; 704/500
(58) Field of Classification Search .................. 704/246, 704/247, 251, 252, 260, 500–504
See application file for complete search history.

(56) References Cited

U.S. PATENT DOCUMENTS

| | | | |
|---|---|---|---|
| 4,519,057 A * | 5/1985 | Higashihara et al. ...... 369/47.42 |
| 5,875,448 A * | 2/1999 | Boys et al. ..................... 715/531 |
| 6,064,965 A * | 5/2000 | Hanson ......................... 704/275 |
| 2001/0018653 A1 * | 8/2001 | Wutte ............................ 704/256 |
| 2002/0062214 A1 * | 5/2002 | Hanson ......................... 704/260 |

FOREIGN PATENT DOCUMENTS

| | | |
|---|---|---|
| JP | 2-251998 A | 10/1990 |
| JP | 7-160289 A | 6/1995 |
| JP | 8-292790 A | 11/1996 |
| JP | 2001-188552 A | 7/2001 |
| WO | WO 01/46853 A | 6/2001 |

OTHER PUBLICATIONS

Office Action mailed Jul. 14, 2009 from corresponding Japanese Application No. 2004-544587.
Office Action dated Feb. 17, 2011 from corresponding European Application No. 03 808 837.3.

* cited by examiner

*Primary Examiner* — Leonard Saint Cyr
(74) *Attorney, Agent, or Firm* — Wolf, Greenfield & Sacks, P.C.

(57) ABSTRACT

During the replaying of audio data stored in a, which audio data corresponds to text data from a text composed of words, the replaying of the audio data in forward and reverse modes is controlled. Starting from particular momentary replay position in the audio data, a backward jump over a return distance corresponding to the length of about at least two words, to a target position, is automatically initiated for the replaying of the audio data in the reverse mode. Then, starting from the particular target position, a replay of the audio data in the forward sequence for just one part of the return distance is undertaken.

25 Claims, 7 Drawing Sheets

ARRANGEMENT AND METHOD FOR REPRODUCING AUDIO DATA AS WELL AS COMPUTER PROGRAM PRODUCT FOR THIS

The invention relates to an arrangement for replaying audio data, which audio data corresponds to text data from a text composed of words, with memory means for storing the audio data, into which memory means audio data to be stored can be read in a forward sequence, and with control means for controlling the replaying of stored audio data in a forward mode and in a reverse mode, and with audio replaying means.

The invention further relates to a method for replaying audio data stored in memory means, which audio data corresponds to text data from a text composed of words, and into which memory means audio data to be stored is read in a forward sequence, during which method the replaying of audio data can be controlled in a forward mode and in a reverse mode.

The invention further relates to a computer program product and to a computer designed for executing a computer program product of this kind.

In the manual or automatic transcription of texts, especially when correcting texts transcribed automatically using voice recognition systems, it is usual to listen to the dictated text, stored digitally in the form of audio data, by means of audio replaying means, e.g. headphones, wherein it may be, in the case of texts that have already been transcribed and have to be corrected, that the text corresponding to the stored audio data and already stored as a text file is displayed simultaneously by means of text display means, e.g. a monitor of a computer workstation. In particular, it is also known hereby for the audio data and the text data relating to each other to be provided with corresponding word-marking data, which indicates the start of a word, for example, and which displays audio data and text data that correspond with each other, i.e. match, as linkage data, in order that they can be synchronously replayed, acoustically and visually, in forward mode. An appropriate technology for this purpose is described in e.g. patent document WO 01/46853 A1. It is hereby also known for the particular word that is currently being acoustically replayed to be visually highlighted in the text section being visually displayed, which may also be realized using the control data formed by the word-marking data, or linkage data.

The listening to and displaying of words in relation to each other are hereby enabled only in the forward mode and the forward sequence. If, starting from a momentary replay position, a return to a previous text location, counter to the forward sequence, takes place, an audio replay may simultaneously also be enabled, but this will likewise be counter to the forward sequence and will thereby be in an incomprehensible form. If, for example, a dictation is transcribed automatically or manually, and the person undertaking the transcribing and, if applicable, correction differs from the person who has dictated the dictation, the return to previous text locations will be found particularly irritating by this person undertaking the transcription, since he is completely unaware of the spoken text and since, depending on the available software, the audio data—which is stored in memory means in a digital form—is presented to him in rapid succession, counter to the forward sequence, in an incomprehensible form. It will then be necessary for this person to switch manually to replay in the forward sequence and to listen to the dictation passages in question and, in the case of a previous automatic transcription, to check the associated text words visually, wherein an audio replaying synchronous with the visually displayed text is possible only in this forward mode. This implies a comparatively high time input, as a result of which the concentration of the person processing the text may be impaired. His processing efficiency will also be detrimentally affected.

Patent document U.S. 2002/0062214 A1 describes a text-marking system in which word groups are displayed on a computer monitor, wherein switching fields are provided for the control of different work steps. Two switching fields that are activated separately are hereby provided, in order that a jump may take place from a marked word, visually highlighted in a line of text, to the word immediately preceding it or the word immediately following it, in order to visually highlight this word and simultaneously to replay it acoustically. However, this control system is extremely laborious and time-consuming if, starting from a particular word, a text location a relatively long way before it, e.g. 10 or 20 words before it, is sought, wherein it is necessary to click manually on the appropriate switching field again and again.

It is an object of the invention to remedy this situation and to realize an arrangement and a method to enable the rapid, targeted seeking of spoken text passages in stored audio data, wherein the fewest possible manual control interventions on the part of the person undertaking the processing are also to be necessary.

In accordance with a first aspect, to achieve the object cited above, the invention provides an arrangement for replaying stored audio data, which audio data corresponds to text data from a text composed of words, with memory means for storing the audio data, into which memory means audio data to be stored can be read in a forward sequence, and with control means for controlling the replaying of stored audio data in a forward mode and in a reverse mode, and with audio replay means, wherein the control means are set up in such a way that, during a playback of audio data in reverse mode, starting from the particular momentary replay position in the audio data, they automatically initiate a backward jump, counter to the forward sequence, over a return distance corresponding to the length of at least roughly two words, to a target position, and then, starting from the particular target position, initiate a replay of audio data in the forward sequence for just one part of the return distance.

In accordance with a second aspect, the invention provides a method for replaying audio data stored in memory means, which audio data corresponds to text data from a text composed of words, and into which memory means audio data to be stored is read in a forward sequence, under which method the replaying of audio data in a forward mode and in a reverse mode can be controlled, wherein, during a playback of audio data in reverse mode, starting from the particular momentary replay position in the audio data, a backward jump takes place automatically, counter to the forward sequence, over a return distance corresponding to the length of at least roughly two words, to a target position, and then, starting from the particular target position, a replay in the forward sequence is undertaken for just one part of the return distance.

Using the method in accordance with the invention, a search for particular text passages in the audio data can be undertaken more rapidly and efficiently than in the case of the prior art. If, for example, during a transcription or correction of a text undertaken by a person, the problem arises, when a text location is reached, that this person possibly recognizes a lack of clarity or a discrepancy or an error in a previously transcribed or corrected text location that occurred 10 or 20 words previously in the text being transcribed or corrected, a corresponding search in reverse mode can be undertaken extremely rapidly and fully automatically—following the starting of the method in accordance with the invention—whereby, with computer assistance, a jump takes place automatically, according to the specified return distances, to target positions in the text located further back, and subsequently an acoustic replay takes place for only a specified part of the particular return distance in the forward sequence. As a result, a comprehensible audio playback is realized, so the person in question has no problems of comprehension. The jump backwards in the text represented by the audio data takes place, if a corresponding transcribed text is already available, preferably using word-marking data as control characters, which normally indicate the start of a new word. If no transcribed text is yet available, the return distance for the automatic backward jump in the audio data is estimated, e.g. to correspond to the mean data length or time of at least two words, wherein, for example, a forward replay time of one or two seconds constitutes the basis. In this context, therefore, it can also be stated that the particular return distance does not have to correspond precisely to the length of multiple actually spoken words, since the audio data may also be divided into segments according to averaged "word lengths". The same applies to the duration of the replay in the forward sequence provided after each backward jump.

Accordingly, under the method in accordance with the invention, a jump backwards by (roughly) two or three words may occur, followed by an automatic audio replay of (roughly) one word, wherein the word currently being replayed will afterwards be one of the two or three words over which the backward jump in the audio data takes place in the following procedural step. It is, however, also conceivable to jump backwards by a return distance corresponding to a larger number of words and, when replaying in the forward sequence, only to activate or replay one word at a time in the spoken text, so, for example, only every fourth or fifth word is replayed. However, multiple words may also be replayed in the forward sequence.

The audio replay may occur simply word-wise, i.e. pending the appearance of the next word-marking data if this is already available, wherein this next word-marking data identifies the start of the next word. However, a segment-wise replay may also be undertaken with a fixed replay time, e.g. in the range of 0.5 to 1.5 seconds, e.g. corresponding to an averaged word duration, which is stipulated by a timing circuit. This will be the case primarily if no transcribed text with corresponding word-marking data is yet available. It is also conceivable for one word to be replayed as a whole and the next marked word only partly at the start of the word. It is further conceivable for the person undertaking the processing to choose between the different options cited above.

During the reverse search run described, it is further preferred in accordance with the invention for the particular audio replay in the forward sequence to take place at an adjustable speed in order that the person undertaking the processing can cause the search run as a whole to take place more quickly or more slowly as required. The backward jump to the former target position in the text being replayed, as may be stipulated e.g. by the word-marking data mentioned, can be undertaken very quickly, i.e. virtually without time loss, wherein, in this "fast rewind" mode, no acoustic audio replay need be undertaken.

The method in accordance with the invention may be used to very particular advantage in conjunction with a transcription system, with which dictations arriving in a manner that is conventional per se, e.g. via a communication network such as LAN, WAN or Internet, or via sound carriers, are converted automatically by voice recognition means into a text file which is then checked and, if applicable, corrected using word processing software while listening to the dictation audio data. A linkage of the words in the audio file on the one hand and the associated words in the text file on the other is hereby made on the basis of the assigned word-marking data, which is therefore also designated linkage data. During the replay, the word currently being replayed acoustically is also highlighted visually on the text display means, e.g. by underlaying with a light background. The invention here provides a "synchronous reverse replay mode", wherein the words from the text file are visually highlighted in sequence—counter to the forward sequence—and, synchronously with each word visually highlighted, the word in the audio data corresponding to this word is replayed acoustically in the recording sequence, i.e. comprehensibly. This achieves the advantage that the checking of associated, visually displayed words with the aid of a comprehensible audio replay of the corresponding audio data can be undertaken without problems. A localization of a position in the text is also significantly simplified, and the overall efficiency of the correction of transcribed dictations is increased.

The invention can thereby be used to advantage in a typical transcription system of this kind, in which dictations are received by receiver stations and automatically transcribed by transcription stations, after which a manual correction of the transcribed dictations is undertaken by a correction station and finally, a delivery of text files corresponding to the received dictations is undertaken by the delivery station. However, the invention may, of course, also be used in a transcription system realized by a single computer, especially a personal computer, with which the steps mentioned, namely the reception, the automatic transcription, the correction and finally the delivery of the text data, may be undertaken.

As already mentioned, the invention may, moreover, also be used for a manual transcription of a dictated text if, using the dictation, i.e. the audio data being listened to, the text file is produced manually with a word processing system, preferably with assignment of linkage data for the audio data and the text data corresponding to the above-mentioned word-marking data, wherein, following the production or transcription procedure, corrections are also made if applicable. In particular, therefore, the invention may also be realized in a mobile dictation apparatus or an audio-replay apparatus of digital design.

In accordance with a third aspect, the invention also provides a computer program product that can be loaded into a memory of a computer and which comprises sections of software code in order that, by means of their implementation following loading into the computer memory, the method in accordance with the invention can be implemented with the computer.

Finally, in accordance with a fourth aspect, the invention provides a computer with a processing unit and an internal memory, which computer is designed to implement the computer program product in accordance with the invention.

The invention will be further described with reference to examples of embodiments shown in the drawings, to which, however, the invention is not restricted.

Figure 1:
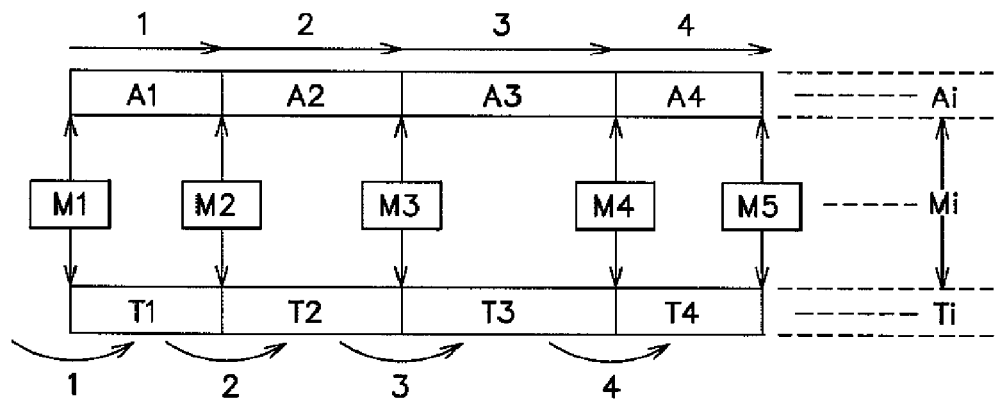
FIG. 1 shows, schematically, a routine for the synchronous replaying of audio data and text data in a forward mode.

FIG. 1 illustrates schematically a routine for the replaying of audio data A1 . . . A4 (generally Ai) synchronously with text data T1 . . . T4 (generally Ti) in a forward mode, wherein the replaying (reading out) of the data takes place in the same sequence, or the same direction, as the recording (reading-in) of the data (from left to right in FIG. 1). This sequence is always designated the forward sequence. Audio data Ai and text data Ti, in associated pairs, hereby represent a succession of words A1/T1 . . . A4/T4 from a text. A word-marking code or word-marking data M1 . . . M5 (generally Mi), which simultaneously forms linkage data for a synchronous replaying of the audio data Ai and text data Ti, is assigned to the start of each word. During replaying, text data T1, T2 . . . T4 (i.e. successive words) are activated successively in accordance with the arrows 1, 2, 3, 4 shown at the bottom of FIG. 1, and highlighted visually on a display means (not shown in FIG. 1), and, synchronously with this, the particular word is replayed acoustically, from the corresponding digital audio data A1, A2 . . . A4, in accordance with the steps indicated at the top with arrows 1, 2, 3 and 4. This simultaneous visual and acoustic replaying of words from the text using the marking or linkage data Mi in a forward mode represents the prior art which is known per se.

Figure 2:
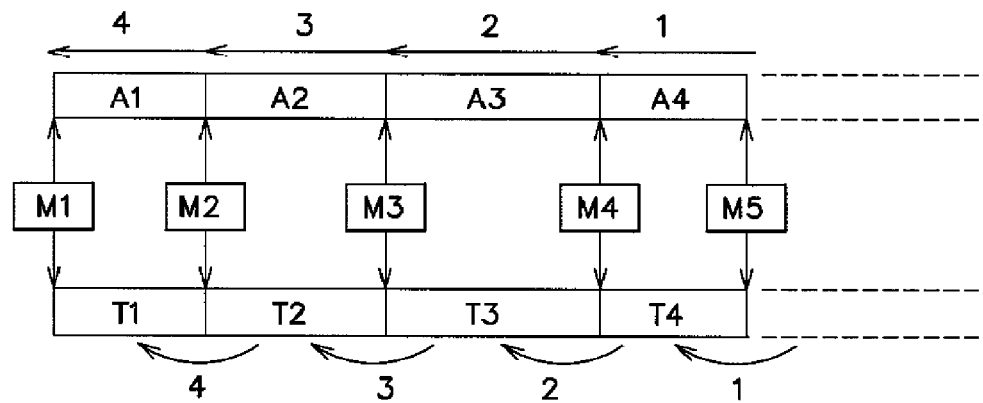
FIG. 2 shows, schematically, a routine for the replaying of audio data and text data with mutual assigning in a reverse mode according to the prior art.

FIG. 2 also illustrates schematically a known routine for replaying in a reverse mode. Here, the words T4, T3, T2, T1 are activated backwards in succession, from right to left as shown in FIG. 2, as indicated by the bottom arrows 1, 2, 3 and 4, and highlighted visually on the display means, which are not shown. Simultaneously, using the word-marking or linkage data M5, M4, M3 and M2, the corresponding audio data A4, A3, A2 and A1, i.e. the words counter to the forward sequence, are replayed as indicated by the top arrows 1, 2, 3 and 4 in FIG. 2. This acoustic replaying thereby takes place counter to the recording sequence, i.e. counter to the recording direction, and therefore results in an incomprehensible audio signal. This impedes the finding of particular text locations, which is possible only on the basis of the visual display, but this conflicts with the normal operating mode during the transcription or correction of texts following a dictation, since persons who are undertaking a transcription or the correction of a text direct their concentration towards an acoustically replayed audio signal when searching both backwards and forwards, wherein, even when processing directly, these persons will also write or correct the text according to the heard audio signal.

If no transcribed text (with words T1 . . . T4) is yet available, the finding of words located further back through the sole use of audio data Ai is extremely cumbersome in this case.

Figure 3:
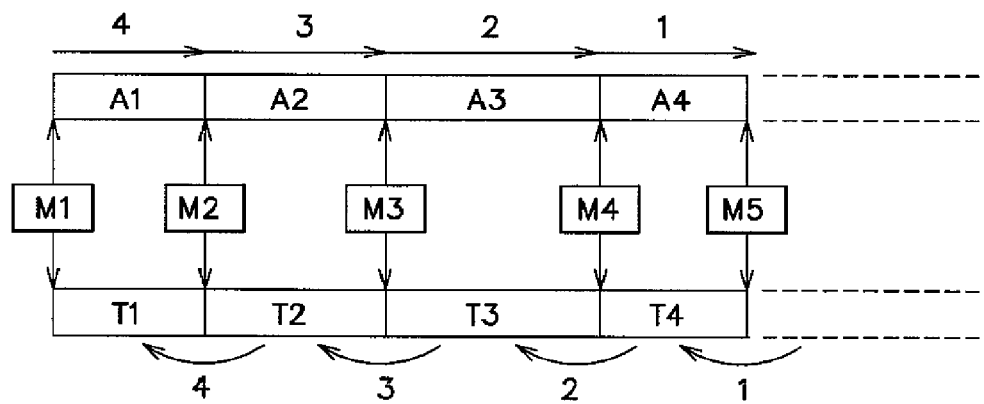
FIG. 3 shows, schematically, a routine for the replaying of audio data and text data in a reverse mode in accordance with the invention.

Differing from these known techniques, the individual audio data Ai can now be replayed acoustically in reverse mode also, so, in the case of the above sequence A4, A3, A2 and A1, for example, this will be in the forward sequence, i.e. in the recording direction, as shown schematically in FIG. 3 with arrows 1, 2, 3, 4 above the audio data A4, A3, A2, A1. Simultaneously, if corresponding text data T4, T3, T2, T1 is already available, a visual display of the words represented by the text data Ti is initiated in accordance with arrows 1, 2, 3 and 4 at the bottom of FIG. 3.

Figure 4A:
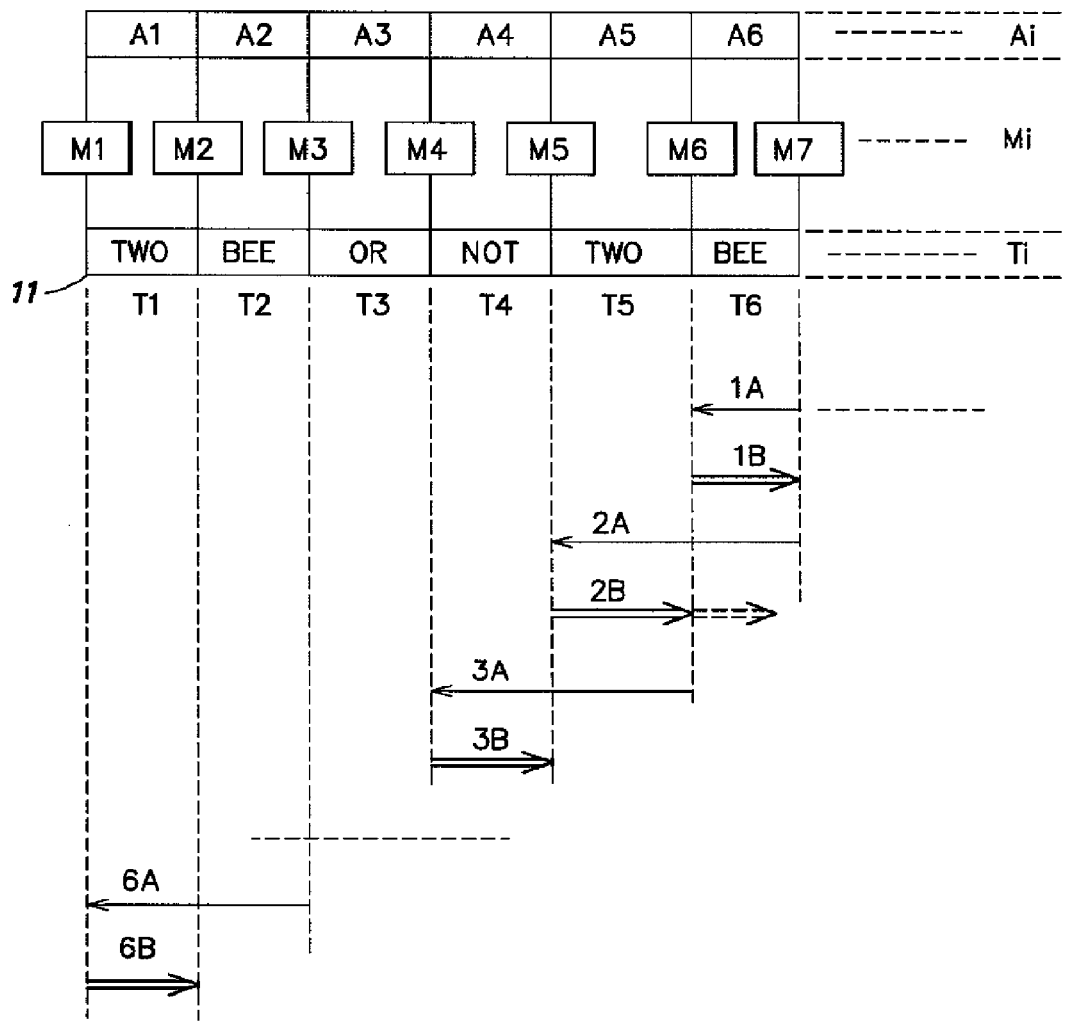
FIG. 4A shows a routine similar to the routine shown in FIG. 3 for the audible replaying of audio data in a reverse mode, wherein a text that has been previously automatically transcribed and requires correction is illustrated.

FIG. 4A illustrates in detail how a backward jump in the audio data A1 to A6 as well as the associated text data T1 to T6 takes place during a "synchronous replaying in reverse mode" of this kind, and a comprehensible audio replay is generated. The example used is that of a text passage in a dictation which should correctly read "TO BE OR NOT TO BE" (see also FIG. 4B), but which has been transcribed by an automatic transcription system in the form shown in FIG. 4A, namely "TWO BEE OR NOT TWO BEE". In FIG. 4A, this word sequence is shown in a bar 11, which appears as such on, for example, a (not shown) visual display means, e.g. a monitor, to display the individual words—the text data T1, T2 . . . T6—visually. These words are also stored as corresponding audio data A1, A2 . . . A6 in digital form in the audio-data memory means, which is not shown in FIG. 4A, and can be read from this for audio replay. The word-marking or linkage data Mi provided for this purpose is again indicated schematically in FIG. 4A at M1, M2 . . . M7.

Specifically, as shown in FIG. 4A, a backward jump takes place from a momentary replay position located further on in the spoken or transcribed text Ti (further to the right in FIG. 4A) to a previous target position, e.g. to the start of the word T6/A6 ("BEE") as identified by linkage data M6. This backward jump is indicated by arrow 1A in FIG. 4A. Subsequently, specifically this word A6 is replayed in the forward sequence from the stored audio data Ai, see arrow 1B. At the end of the word A6/T6 (or at a next word marked by marking data M7), a backward jump (see arrow 2A) takes place automatically, in this case over a minimum return distance corresponding to the length of two words A5+A6, or T5+T6, to the start of word T5 (text data) or A5 (audio data) as indicated by linkage data M5, after which the word A5 is replayed as an audio signal in the forward sequence as indicated by arrow 2B. This procedure is automatically repeated successively with words A4/T4, A3/T3 etc., see arrows 3A (backward jump to target position M4), 3B (acoustic replay of word A4 in recording direction) etc. as far as arrows 6A, 6B. In FIG. 4A, therefore, the arrows 1A, 2A, 3A . . . 6A indicate the return distances, whereas the arrows 1B, 2B, 3B . . . 6B indicate those sections of the return distances for which an audio replay in the forward sequence takes place.

Figure 4B:
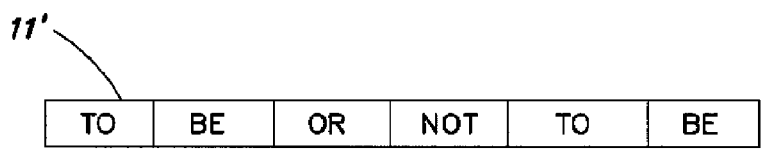
FIG. 4B shows the text corrected using the routine shown in FIG. 4A during a replay in reverse mode, as a sequence of words displayed on e.g. a monitor.

During the described section-wise backward jumping and listening to the individual words Ai in the forward sequence, the particular word may be directly corrected per se, or a return is made to the start of the particular text passage, after which the entire word sequence T1 to T6 may be corrected in the normal manner by listening in the forward sequence and visual display also in the forward sequence, so the correct text, as shown in bar 11' in FIG. 4B, is obtained.

During the acoustic replaying of the individual audio data A1 . . . A6, the text data corresponding to it, T1 . . . T6, is especially visually highlighted on the monitor, e.g. through the displaying of a light background.

It is also indicated schematically in FIG. 4A, by means of a broken-line extension at arrow 2B, that the acoustic replaying may also extend past the word in question to include—in part—the next word in line, i.e. a "word-overlapping" audio replay may be provided. This happens, for example, when the marking data Mi next in line, e.g. M6, is not used as the control code in order to terminate the particular audio replay, but a fixed replay time based on time counting is provided. The fixed replay time may be e.g. one second or 1.5 seconds, or even a little less than a second. A predetermined time duration of this kind for the audio replay should be provided in particular if no transcribed text is yet available and therefore no word-marking data is yet available as a control code either.

In a similar manner, the return distance for the backward jump may also be calculated to correspond to fixed time spans, e.g. corresponding to twice or three times a mean word length.

Figure 5:
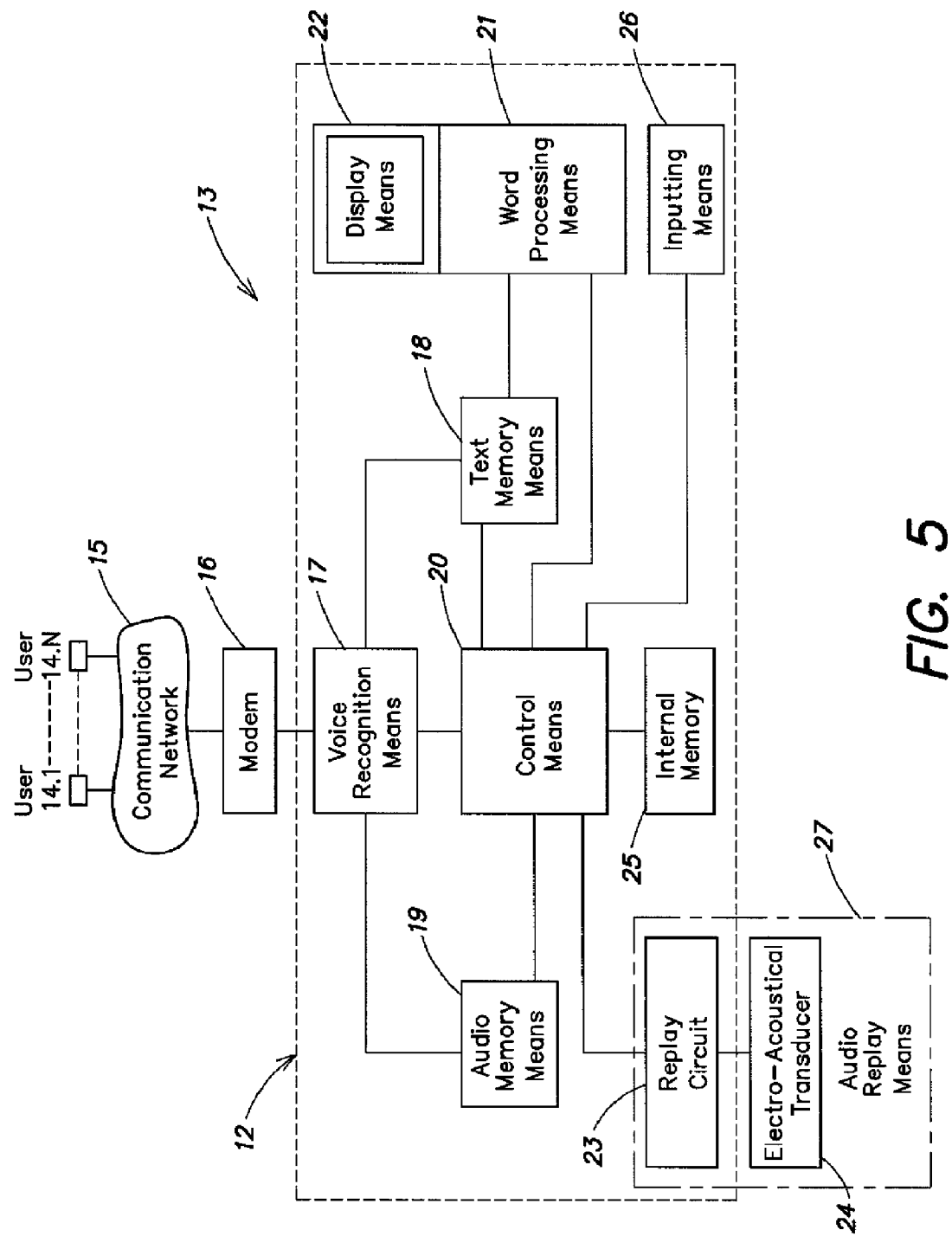
FIG. 5 shows, schematically in the form of a block diagram, a transcription system with an arrangement for audio replay, with which "synchronous reverse mode replay" in accordance with the schematic illustrations shown in FIG. 3 and FIG. 4A can be undertaken.

FIG. 5 shows an example of an arrangement 12 for replaying audio data Ai synchronously with the replaying of text data Ti, which arrangement comprises a transcription data processing device 13. With this arrangement 12, in a manner that is normal per se, a dictation file is transmitted from users 14.1 . . . 14.N via a communication medium, e.g. a communication network 15 such as LAN, WAN or Internet, to the arrangement 12, and received via a communication device, a modem 16 in the present case, and then sent to voice recognition means 17. It should be mentioned that the communication means may also be realized by a so-called "Private Branch Exchange", or PBX for short.

The voice recognition means 17, in which voice recognition software that is normal per se is implemented, undertakes an automatic transcription of the dictation file into a text file, wherein, while generating the word-marking data or linkage data Mi to correspond to the individual items of audio data Ai from the associated audio file, the individual words of text data Ti are stored in text memory means 18 and audio memory means 19 respectively. As already stated above, the words in the text data Ti and in the audio data Ai (text memory means 18 and audio memory means 19 respectively) that correspond with each other are permanently assigned to each other, or linked, to each other by means of the word-marking data Mi. Via this linkage, audio data and text data Ai and Ti belonging together can be invoked and replayed in pairs by control means 20. The visual replaying of text data Ti initiated by control means 20 takes place via word processing means 21 on display means 22, such as, in particular, a computer monitor.

The acoustic replaying of audio data Ai takes place by reading the digitally stored audio data Ai from memory means 19 and sending it to a replay circuit 23 for an electroacoustical transducer 24, wherein headphones are generally used for this purpose. Reading takes place hereby in the forward sequence.

The control of the entire routine when jumping backwards from the momentary replay position to previous target positions in the text and for synchronous forward replay takes place using sections of software code stored in an internal memory 25. As the interface with the user for activation of the particular control procedures and for the various inputtings in the course of transcription or text correction, a conventional keyboard or similar serves as the inputting means 26. A footswitch operating device may also be provided to control forward and backward replay.

The replay circuit 23, which may, in a manner that is normal per se, comprise a digital/analog converter, an amplifier and similar components, and the transducer 24 together form audio replay means 27.

Figure 6:
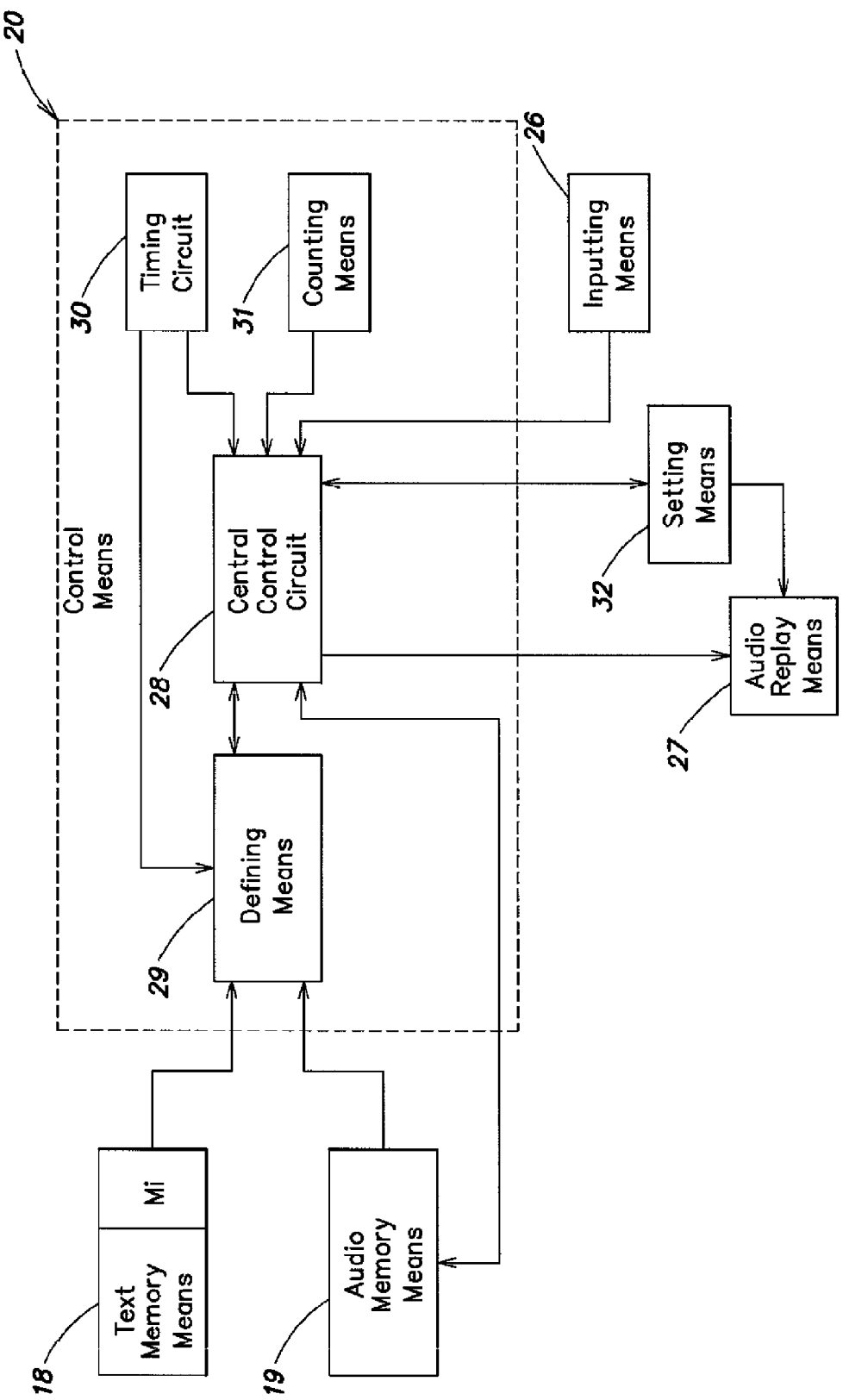
FIG. 6 shows, in the form of a block diagram and in a more detailed manner, the system components of the transcription system shown in FIG. 5 that are provided for a "synchronous reverse mode replay".

FIG. 6 shows, in greater detail, how control means 20 controls the replaying, or reading, of audio data Ai from audio memory means 19, and sending it to replay means 27 in association with text data Ti, together with word-marking data Mi, stored in e.g. text memory means 18. A central control circuit 28 is hereby connected to audio memory means 19, either directly or via defining means 29, which defines the particular return distance when jumping backwards in audio data Ai. Also connected to control circuit 28 is a timing circuit 30 to enable the acoustic replaying of the audio data in the forward sequence in the reverse mode, as described above with reference to FIG. 4A, over a predetermined, fixed time duration. Timing circuit 30 may be, for example, a normal clock generator, wherein control circuit 28 measures the particular time duration desired—which can be set via e.g. the inputting means 26—through the counting of clock pulses. A replaying time duration (see arrow 2B in FIG. 4A) of e.g. one second or 1.5 seconds can be set in this way. As an alternative, if word-marking data Mi is already available, a "word-wise" replaying may also be selected, wherein, when the marking data Mi next in line is reached, the replay procedure is terminated by control circuit 28. Timing signals, especially clock pulses, emitted by timing circuit 30 may also be used as the basis for determining the return distances in defining means 29.

It is preferably further possible to set the return distance for section-wise backward jumping to target positions in the previous text, wherein the skipping of more than two words at a time, e.g. of three, four or five words, is conceivable, and wherein the corresponding number of marking data or linkage data Mi must be counted. To this end, control circuit 28 is connected to counting means 31.

Like timing circuit 30, this counting means 31 may, of course, be realized in terms of software with the aid of control means 20, as may defining means 29, which may be realized by corresponding addressing in memory means 19. Control circuit 28 in accordance with FIG. 6 then coincides with control means 20 in accordance with FIG. 5. In addition, setting means 32 is provided for setting the speed of the audio replay with replaying means 27.

It should be mentioned that the word-marking data Mi may also be stored, as a whole, in audio memory means 19, or divided up, in both text memory means 18 and audio memory means 19.

Figure 7:
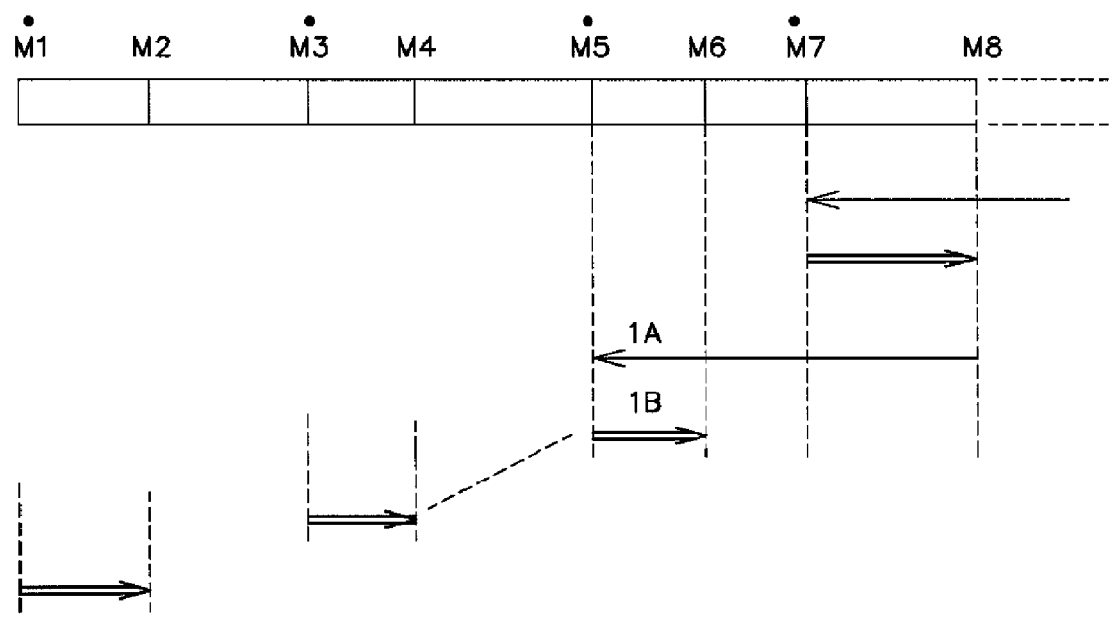
FIG. 7 shows a modified routine for a replay in reverse mode that is similar to the routine shown in FIG. 4A, but somewhat simplified.

For the purpose of better illustration, FIG. 7 shows schematically the procedure during backward jumping by more than two words at a time, e.g. by three words at a time, see arrow 1A in the reverse direction, wherein, following a backward jump procedure of this kind, an audio replaying of the following word in the forward direction, i.e. the forward sequence, takes place, see e.g. arrow 1B in FIG. 7. In this manner, in the example shown in FIG. 7, only those words identified by the marking data M7, M5, M3, M1 (in this order) are acoustically replayed, see also the dot above this reference letter in FIG. 7. Those words to which marking data M8, M6, M4 and M2 are assigned are, however, skipped as regards acoustic replaying.

More than three words at a time may, of course, also be skipped during backward jumping, so only every third, fourth etc. word will then be replayed during the subsequent acoustic replaying.

Figure 8A:
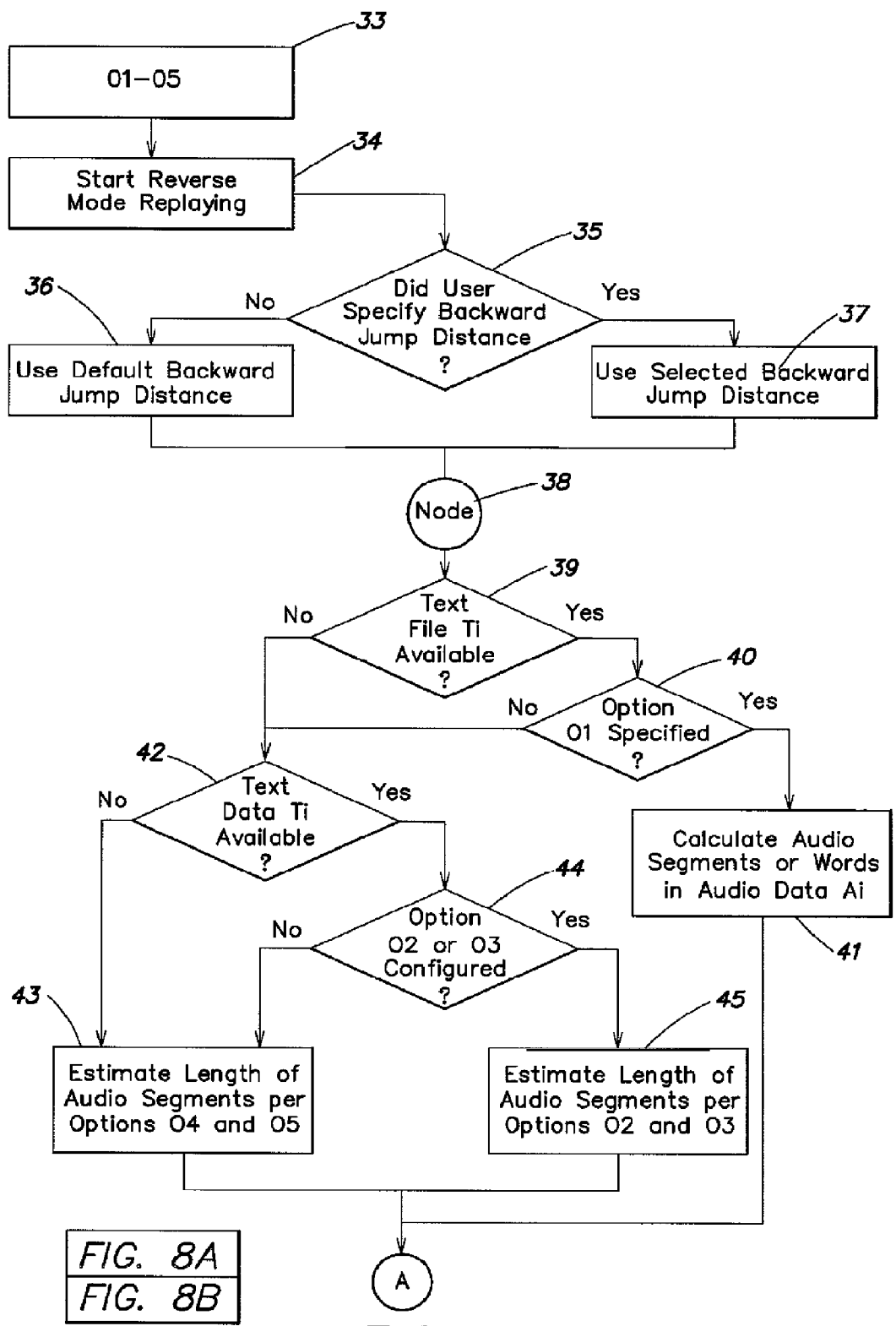
FIG. 8 shows, in the form of a flowchart, a variant of a method for synchronous replay in reverse mode.
Figure 8B:
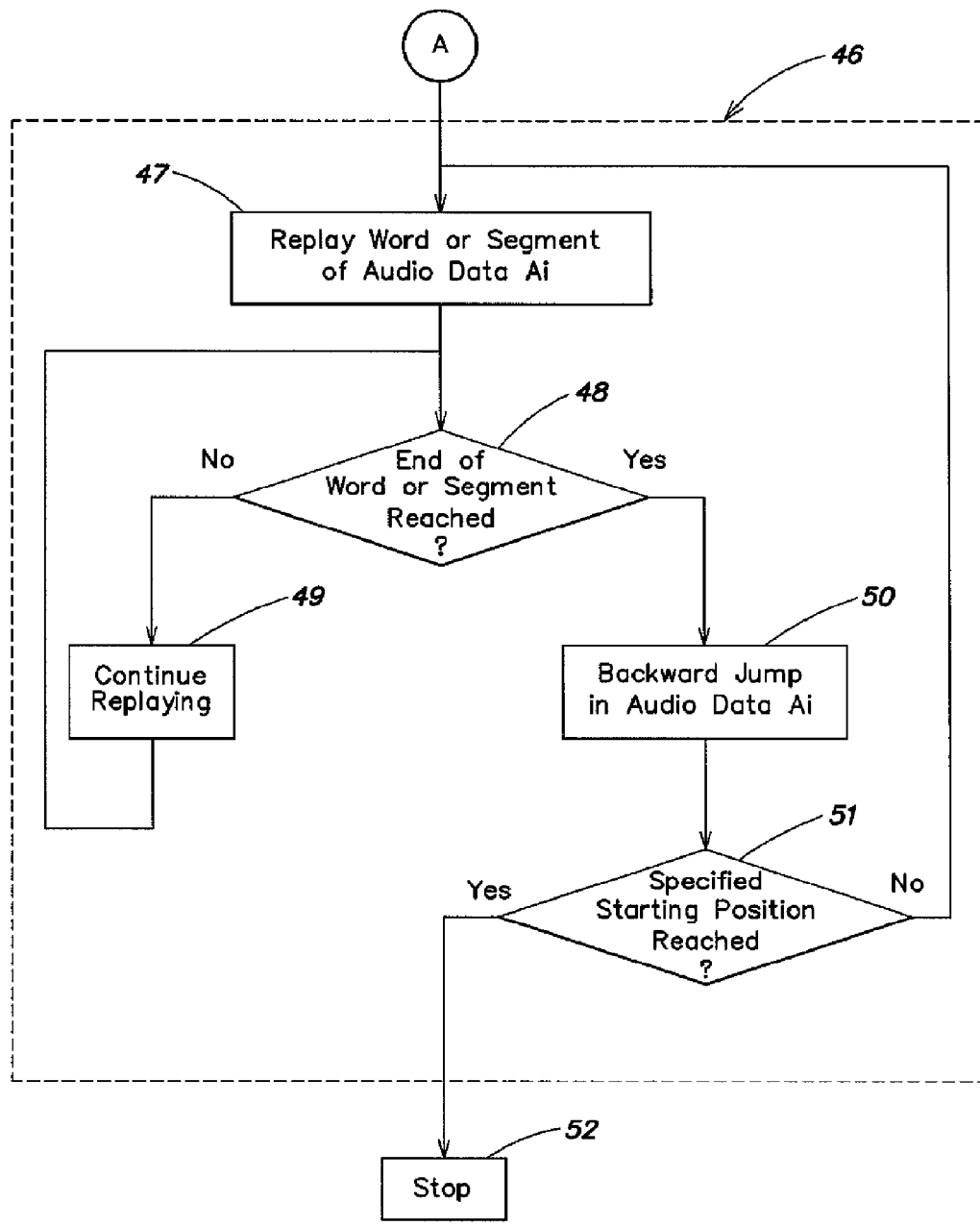

FIG. 8 shows a flowchart which illustrates an example of the procedure during the above-mentioned synchronous reverse replaying and forward replaying. The flowchart also comprises configuration stages and calculation stages that precede the actual backward jump procedure and forward replay procedure.

According to FIG. 8, starting at a block 33, a configuration takes place of options O1 to O5 as regards the audio replaying and calculation of return distances 1A, 2A, 3A . . . 6A for backward jumping in the audio data, as described above. These options O1 to O5 may be provided as follows, for example:

O1—This option O1 is selected if voice recognition means 17 is provided and used to create text data Ti automatically from the audio data Ai, wherein the described word-marking data Mi is then also automatically defined as linkage data by voice recognition means 17.

O2—This option O2 relates to the case where manually transcribed text data Ti is to be used to define the length of individual segments or "words" of the audio data Ai. A fixed length for all audio segments is provided in accordance with option O2, which length is calculated from the total time duration of audio data Ai and the number of transcribed words by simple division, using control means 20. The individual audio segments or words may then be "numbered", i.e. provided with addresses or indices, in order to use the numbers or addresses to determine the return distances 1A, 2A, 3A . . . 6A and/or the sections 1B, 2B, 3B . . . 6B to be replayed acoustically.

O3—This option O3, which is very similar to option O2, is selected if—likewise on the basis of a manual transcription of text data Ti on the basis of the heard audio data Ai—the audio segments are calculated by control means 20 with variable lengths, on the basis of the syllables of the words and the total length of audio data Ai. All syllables are hereby assumed to be of the same length.

O4—Option O4 may be selected if no text data Ti is yet available, wherein the lengths of audio segments or words of audio data Ai are calculated on the basis of audio-energy-profile information.

O5—With this option O5, audio segments of fixed lengths are assumed, e.g. segment lengths of one second, wherein an overlapping of segments, e.g. with a time duration of ⅓ second, may also be provided.

Speeds for normal replaying in the forward sequence, for backward jumping rapidly, forward replaying rapidly and for section-wise audio replaying in the forward sequence during backward jumping may also be selected at block 33.

At a block 34, the reverse mode replaying in question here is then started, e.g. by actuating a corresponding key on the inputting means 26. It is then automatically queried at a block 35 whether the user has specified an overall return distance over which the backward jump in audio data Ai is to take place in total in reverse mode. If this is not the case (see output N of block 35), an appropriate overall distance for the backward jump is automatically stipulated as a default value, e.g. a backward jump to the start of the audio data, see block 36 in FIG. 8. If, however, the user has made an appropriate entry (output Y of block 35), the selected overall return distance is used as the basis at a block 37.

The two branches in the flowchart of FIG. 8 thus arrived at then come together again and, at a node 38, it is illustrated symbolically with an arrow that the steps that now follow will be repeated in the event of a text amendment before the momentary audio position, without the reverse mode (see block 34) being terminated.

At a block 39, it is then queried whether voice-recognition output data is available, i.e. whether text files Ti transcribed automatically using voice recognition software in voice recognition means 17 are available. If this is the case (see output Y of block 39 in FIG. 8) it is queried at a block 40 whether option O1 (see block 33) has been specified. If this is the case (output Y of block 40), the calculation of the audio segments or words in the audio data Ai then takes place at a block 41 in a manner corresponding to the known and edited text words in text data Ti.

If, however, voice recognition is not used (output N of block 39), it is queried at a block 42 whether or not text data Ti is present before the momentary audio position. If this is not the case (output N of block 42), i.e. if no text data Ti is yet available, an estimation of the length of audio segments is made at a block 43 on the basis of the overall length of audio data or the audio energy profile, see the above options O4 and O5.

If, however, according to the check at block 42, text data Ti is already present before the momentary audio position (see output Y of block 42), it is then queried at a block 44 whether option O2 or O3 was configured at block 33, and, if an option O2 or O3 was not configured (output N of block 44), the estimation described above in connection with block 43 likewise takes place. In the event of the configuration of an option O2 or O3 (output Y of block 44), an estimation of the length of the audio segments or words of the audio data Ai then takes place at a block 45 on the basis of the overall length of the audio data and the number of words or syllables (options O2 and O3).

In area 46, outlined with broken lines, of the flowchart shown in FIG. 8, the actual steps involved in the backward jump and the section-wise replaying in the forward sequence are undertaken. At a block 47, the audio replaying of a word or segment of audio data Ai in the forward sequence, thereby in a comprehensible manner, is started, wherein the replay takes place at the speed set at block 33. At a block 48, it is then queried whether the end of the word or segment of audio data Ai to be replayed in the forward sequence has been reached. If this is not the case (output N), replaying is continued at a block 49 until eventually the query at block 48 reveals that the end of the word or segment has been reached (output Y of block 48). At a block 50, a backward jump in audio data Ai to the next specified target position then takes place, e.g. over a return distance corresponding to the length of three words. Subsequently, it is queried at a block 51 whether the specified starting position (see blocks 36 and 37) has been reached. If this is not the case (output N), a return to block 47 takes place. If, however, the starting position, i.e. the end of the reverse mode, has been reached (output Y of block 51), the reverse mode is terminated at a block 52.

It is also preferable if provision is made for the procedure described, which runs automatically, controlled by control means 20, to be terminated manually at any time before the specified end is reached by means of a "STOP" input at inputting means 26.

It should be mentioned that, following correction of the text, a redefinition of the word-marking data Mi or a recalculation of the length of the audio segments may be necessary in some circumstances.

It should further be mentioned that, following a backward jump constituting more than two words, e.g. four, five, six or more, an acoustically satisfactory replaying of more than one word, e.g. of two or three or four words, may be undertaken.

The invention claimed is:

1. A system for replaying stored audio data, the system comprising:
 voice recognition means for performing voice recognition on the audio data and generating by the voice recognition means text data and word-marking data, the word-marking data indicating locations of word boundaries between spoken words within the audio data and linking words in the audio data to corresponding words in the text data, wherein the word-marking data is assigned, in the absence of user input, by the voice recognition means to the start of each spoken word in the audio data;

memory means for storing the audio data and for storing the text data and the word-marking data obtained from performing voice recognition on the audio data;

audio replaying means for replaying the audio data acoustically in a forward sequence;

display means for visually displaying the text data; and control means for controlling the replaying of stored audio data in a forward mode and in a reverse mode, the control means controlling the audio replaying means during a playback of the audio data in the reverse mode to perform a reverse mode playback operation including, starting from a replay position in the audio data initiating a backward jump, counter to the forward sequence, over a distance corresponding to a length of at least N spoken words, to a target position, the control means using the word boundaries indicated in the word-marking data to determine the target position, and then, starting from the target position, the control means initiating a replay of K spoken words of the audio data in the forward sequence using the word boundaries indicated in the word-marking data to determine the end of the replay of the K spoken words, wherein K is less than N, the control means controlling the displaying on the display means of the stored text data that corresponds to the audio data being replayed, as indicated by the word-marking data, the control means further controlling the audio replaying means and the display means to automatically repeat performing the reverse mode playback operation while the system is in the reverse mode, wherein, in the reverse mode, words of the text data are visually highlighted on the display means in sequence, counter to the forward sequence, and, synchronously with each visually highlighted word, a corresponding word in the audio data is replayed acoustically.

2. The system as claimed in claim 1, wherein repeating the reverse playback operation causes each of the K words on each repetition of the playback operation to be replayed acoustically in the forward sequence and in an order counter to the forward sequence.

3. The system as claimed in claim 2, wherein a counting means is assigned to control means in order to count the marking data reached during backward jumping or replaying.

4. The system as claimed in claim 1, wherein a timing circuit is assigned to control means in order to calculate the duration of the audio replay.

5. The system as claimed in claim 1, wherein setting means is connected to control means in order to set the speed of the audio replay.

6. The system as claimed in claim 1, wherein the control means is further connected to text memory means for storing text data corresponding to the audio data, which is connected to text display means, and wherein the control means is set up to initiate, by means of linkage data for the audio data and text data, a synchronous replaying of the audio data and the text data corresponding to it.

7. The system as claimed in claim 6, wherein the control means and the text memory means and the memory means for the audio data are connected to the voice recognition means, which undertakes an automatic transcription of the audio data to generate the text data.

8. A method for replaying audio data stored in at least one memory, the method comprising acts of:

performing voice recognition, by a voice recognition system, on the audio data and generating text data and word-marking data, the word-marking data indicating locations of word boundaries between spoken words within the audio data and linking words in the audio data to corresponding words in the text data, wherein the word-marking data is assigned, in the absence of user input, by the voice recognition system to the start of each spoken word in the audio data;

storing the audio data and storing the text data and the word-marking data obtained from performing voice recognition on the audio data;

controlling the replaying of the audio data in a forward sequence;

performing a reverse playback operation while in the reverse mode, the reverse playback operation including starting from a replay position in the audio data, automatically performing a backward jump, counter to the forward sequence, over a distance corresponding to a length of at least N spoken words using the word boundaries indicated in the word-marking data, to a target position, including using the word boundaries indicated in the word-marking data to determine the target position, and then, starting from the target position, replaying K spoken words of the stored audio data in the forward sequence using the word boundaries indicated in the word-marking data to determine the end of the replay of the K spoken words;

displaying the stored text data that corresponds to the audio data being replayed, as indicated by the word-marking data; and automatically repeating the reverse playback operation while the system is in the reverse mode, wherein, in the reverse mode, words of the text data are visually highlighted on the displayed text data in sequence, counter to the forward sequence, and, synchronously with each visually highlighted word, a corresponding word in the audio data is replayed acoustically.

9. The method as claimed in claim 8, wherein automatically repeating the reverse mode playback operation causes each of the K words on each repetition of the playback operation to be replayed acoustically in the forward sequence and in an order counter to the forward sequence.

10. The method as claimed in claim 9, wherein replaying in the forward sequence is automatically terminated when the next word-marking data is reached during replaying.

11. The method as claimed in claim 8, wherein replaying in the forward sequence is automatically terminated after a specified period.

12. The method as claimed in claim 8, wherein, on termination of the replay in the forward sequence, a backward jump over a return distance corresponding to the length of at least roughly two words takes place automatically.

13. The method as claimed in claim 8, wherein the backward jump in the audio data is undertaken at a speed that is higher than the replay speed during replaying in the forward sequence, and without acoustic replaying of the stored audio data.

14. The method as claimed in claim 8, wherein the replaying of the stored audio data in the forward sequence takes place at an adjustable replay speed.

15. The method as claimed in claim 8, wherein, synchronously with the replaying of the stored audio data in the forward sequence, a visual displaying of text data corresponding to the audio data takes place, which displaying is controlled by linkage data for the stored audio data and the text data corresponding to it.

16. The method as claimed in claim 15, wherein, during the visual displaying of multiple words of the text data, the particular visually displayed word for which the corresponding audio data is being replayed is visually highlighted.

17. The method as claimed in claim 15, wherein the text data corresponding to audio data is obtained by means of automatic voice recognition of the audio data, wherein, simultaneously, the word-marking data is generated and stored as linkage data for the text data and audio data that correspond with each other.

18. A memory device encoded with instructions that, when executed by a computer, perform the method of claim 8.

19. A system for replaying stored audio data comprising:
   a voice recognition system configured to perform voice recognition on the audio data and to generate text data and word-marking data, the word-marking data indicating locations of word boundaries between spoken words within the audio data and linking words in the audio data to corresponding words in the text data, wherein the word-marking data is assigned, in the absence of user input, by the voice recognition system to the start of each spoken word in the audio data;
   at least one memory configured to store the audio data and to store the text data and the word-marking data obtained from performing voice recognition on the audio data;
   a display device configured to visually display the text data; and
   a controller configured to replay the stored audio data in a reverse mode by jumping back N spoken words to a target position using the word boundaries indicated in the word-marking data to determine the target position, playing back K spoken words using the word boundaries indicated in the word-marking data to determine the end of the playback of the K spoken words, and then automatically repeating the jumping and playing back while in the reverse mode, wherein K is less than N, the controller further configured to display on the display device the text data that corresponds to the audio data being replayed, as indicated by the word-marking data, wherein, in the reverse mode, words of the text data are visually highlighted on the display device in sequence, counter to the forward sequence, and, synchronously with each visually highlighted word, a corresponding word in the audio data is replayed acoustically.

20. The system of claim 19, wherein N=2 and K=1.

21. The system of claim 19, wherein the controller is configured to skip playback of a number of the words so that only every fourth or fifth of the words is replayed.

22. The system of claim 19, wherein the controller is configured to skip playback of a number of the words so that only every predetermined number of the words is replayed.

23. The system of claim 19, wherein the playing back is for a predetermined duration after which the automatically repeating the jumping and the playing back are performed.

24. The system of claim 19, wherein the jumping back is for a return distance which is one of as estimated mean data duration of the N words and determined from a word-marking data associated with the audio data.

25. The system of claim 19, wherein the playing back is terminated in response to reaching one of a word-marking data associated with an end of the $K^{th}$ word and a predetermined replay time.

* * * * *